(12) United States Patent
Charny et al.

(10) Patent No.: US 7,385,987 B1
(45) Date of Patent: Jun. 10, 2008

(54) SCHEDULING SYSTEM AND METHOD FOR MULTI-LEVEL CLASS HIERARCHY

(75) Inventors: Anna Charny, Sudbury, MA (US); Robert Olsen, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 990 days.

(21) Appl. No.: 10/357,878

(22) Filed: Feb. 4, 2003

(51) Int. Cl.
*H04L 12/56* (2006.01)
*H04J 3/22* (2006.01)

(52) U.S. Cl. .................... 370/395.4; 370/412; 370/468
(58) Field of Classification Search ................ 370/229, 370/230, 230.1, 395.4, 395.41–395.43, 412–418, 370/468
See application file for complete search history.

(56) References Cited

U.S. PATENT DOCUMENTS

| | | | |
|---|---|---|---|
| 5,864,540 A | 1/1999 | Bonomi et al. ............ 370/235 |
| 6,130,878 A | 10/2000 | Charny .................. 370/395.41 |
| 6,408,005 B1 | 6/2002 | Fan et al. .................... 370/412 |
| 6,438,134 B1 * | 8/2002 | Chow et al. ................ 370/412 |
| 6,560,195 B1 * | 5/2003 | Basak et al. ................ 370/230 |
| 6,674,718 B1 * | 1/2004 | Heddes et al. .............. 370/230 |
| 6,721,325 B1 * | 4/2004 | Duckering et al. ....... 370/395.4 |
| 6,909,691 B1 * | 6/2005 | Goyal et al. ................ 370/230 |
| 2002/0163992 A1 * | 11/2002 | Der Haar ...................... 378/19 |
| 2003/0189943 A1 * | 10/2003 | Gorti et al. ................ 370/412 |

* cited by examiner

*Primary Examiner*—Chau Nguyen
*Assistant Examiner*—Marcus R Smith
(74) *Attorney, Agent, or Firm*—Cindy Kaplan (57) ABSTRACT

A scheduling method for a multi-level class hierarchy includes inserting all queues containing at least one packet in a first scheduler and inserting into a second scheduler queues contained in the first scheduler which do not exceed their maximum rate. The first scheduler is dequeued until a queue exceeding a maximum rate of the queue is reached, at which time a queue of the second scheduler is dequeued.

19 Claims, 8 Drawing Sheets

SCHEDULING SYSTEM AND METHOD FOR MULTI-LEVEL CLASS HIERARCHY

BACKGROUND OF THE INVENTION

The present invention relates generally to communication networks, and more specifically, to a method and system for rate-based scheduling.

High speed networks are designed to carry services with a wide range of traffic characteristics and quality-of-service (QoS) requirements. A common task for rate-based QoS enabled scheduling is ensuring that each queue is guaranteed a minimum rate, excess bandwidth is shared in a fair manner, each queue does not exceed a specified maximum rate, and the link is maximally utilized within the maximum rate constraints. While many implementations target this problem, current implementations either scale linearly with the number of queues, or result in substantial underutilization or unfairness.

As noted above, it is important for environments with large numbers of queues that its scheduling system operates in a scaleable manner. Incoming traffic streams flow through the queues ($q_0$-$q_n$) and a scheduler serves each queue to support a maximum rate ($m_0$-$m_n$). Conventional schedulers use O(n) (order (n)) algorithms to perform the scheduling and shaping of the queues. However, at some level of scalability, these algorithms become either infeasible (e.g., there is no available CPU that can process at the required rate) or cost ineffective (e.g., the amount of hardware required to perform the O(n) operation at the required performance level is too costly).

A typical approach taken by conventional scheduler implementations to ensure rate-limiting to maximum rates is to use a set of token-bucket shapers (one per queue). This typically results in an O(n) complexity, as previously described. It is possible to reduce the complexity, in cases where the total rates of all queues do not exceed the link rate, by scheduling the queue eligibility times on a real-time calendar queue. However, this approach does not work in the typical case when the maximum rates are overbooked. A rate-based scheduling system that avoids the O(n) complexity is described in U.S. patent application Ser. No. 10/243,436, filed Sep. 13, 2002, which is incorporated herein by reference in its entirety. However, the system is configured for a single level class hierarchy and is not easily extended to a multi-level class hierarchy.

SUMMARY OF THE INVENTION

Multiple methods and systems for a multi-level class hierarchy are disclosed. A first scheduling system generally comprises a hierarchy of first and second schedulers. The first scheduler at each level of hierarchy is configured to provide a minimum rate to a plurality of queues. Each of the queues contains at least one packet. The second scheduler at each level of hierarchy is configured to share the excess rate in proportion to the configured minimum rates. In addition, the system includes a set of token buckets configured to limit each queue to its maximum rate. The first scheduler services only those queues that have at least one packet and are eligible in their maximum rate token bucket. The scheduling at each level of hierarchy operates as follows: an attempt is made to dequeue from the first scheduler, and if an eligible node is dequeued, then that node is served. Alternatively, an ineligible node (i.e., ineligible with respect to the maximum rate token bucket) may be found, in which case the system moves to the second scheduler and performs a dequeue of an eligible node. When traversing the hierarchy from root to leaf, the dequeued eligible nodes are used to find the next level (i.e., the layer that contains the children of the dequeued eligible node) on which to perform a dequeue. In addition, when an ineligible node is found in the first scheduler, the system traverses the first hierarchy to the leaf level to afford children of the ineligible node the opportunity to become eligible.

A computer program product for the first multi-level class hierarchy method includes code that inserts all queues containing at least one packet in a first scheduler and code that inserts into a second scheduler queues contained in the first scheduler that do not exceed their maximum rate. The product further includes code that first attempts dequeue from the first scheduler, and if a node exceeding a maximum rate is found, then dequeue proceeds from the second scheduler. A computer-readable storage medium is provided for storing codes.

A second scheduling system for a multi-level class hierarchy includes a per-level first scheduler configured to provide a minimum rate to a plurality of queues each containing at least one packet. A set of token buckets is used to limit each queue to its minimum rate. The system further includes a per-level second scheduler configured to schedule queues not exceeding a maximum rate of the queue, and a second set of token buckets used to impose the maximum rates. The second scheduler is configured to share excess bandwidth in proportion to a user selected weight. The scheduling system performs per-level dequeue operations as follows: an attempt is made to dequeue from the first scheduler, and if an eligible node is dequeued, then that node is served. Alternatively, an ineligible node (i.e., ineligible with respect to its minimum rate token bucket) may be found, in which case the system moves to the second scheduler and dequeues an eligible node. Traversal of the hierarchy operates just as in the first scheduling system described above.

A third scheduling system for a multi-level class hierarchy includes a per-level first scheduler configured to provide a minimum rate to a plurality of real queues containing packets and virtual queues containing virtual packets. The system further includes a per-level second scheduler configured to schedule queues not exceeding a maximum rate of the queue minus a minimum rate of the queue. Token buckets are used to ensure the maximum rate is not exceeded. The second scheduler is further configured to share excess bandwidth in proportion to a user selected weight. The scheduling system performs dequeue operations as follows: an attempt is made to dequeue from the first scheduler, and if an eligible node is dequeued, then that node is served. Alternatively, a virtual node may be found, in which case the system moves to the second scheduler and dequeues an eligible node. Traversal of the hierarchy is as in the first and second scheduling systems described above.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. A scheduler system of the present system is located in one or more of the network elements.

The scheduling system is used to schedule a number of queues (q(1), q(2), ... q(N)) with a goal of ensuring that each queue q(i) is guaranteed a specified minimum rate R(i) and at the same time limiting the transmission rate from this queue to another specified maximum rate M(i). The system is configured such that for any queue q(i), R(i) is less than or equal to M(i) and the sum of R(i) over all i=1, 2 ... N does not exceed the speed of the link.

Figure 1:
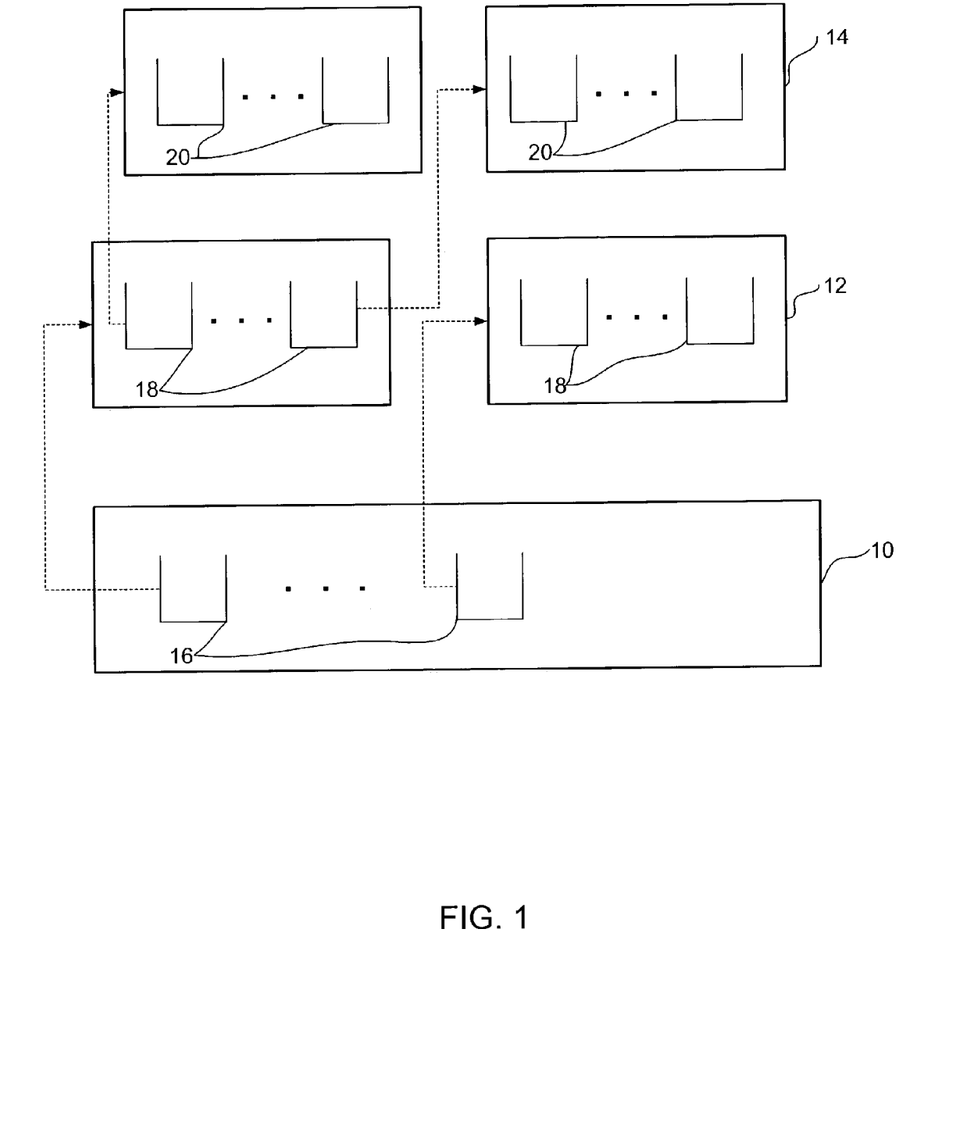
FIG. 1 is a block diagram illustrating a multi-level class hierarchy.

Referring now to the drawings, and first to FIG. 1, a block diagram illustrating a multi-level class hierarchy is shown. The hierarchy shown in FIG. 1 includes three layers 10, 12, 14, however, it is to be understood that the system described herein may be used with any number of layers or queues. The first layer includes a plurality of queues 16 that may represent, for example, individual users. The second layer includes queues 18 (shown only for two of the first layer queues 16) which are configured for different user applications and data, such as e-mail, best effort data, voice, video, etc. The third layer includes queues 20 (shown only for two queues of the second layer queues 18) having data which is broken down even further (e.g., individual e-mails). In the following description, a parent layer is defined as the next higher layer (i.e., the parent of layer 12 is layer 10; layer 12 is the child of layer 10).

The following describes three different embodiments of a scheduling system that is configured for supporting a multi-level hierarchy, such as shown in the example of FIG. 1. Each scheduling system includes two schedulers, one configured to ensure a minimum rate guarantee, while the other is used for sharing excess bandwidth.

Figure 2:
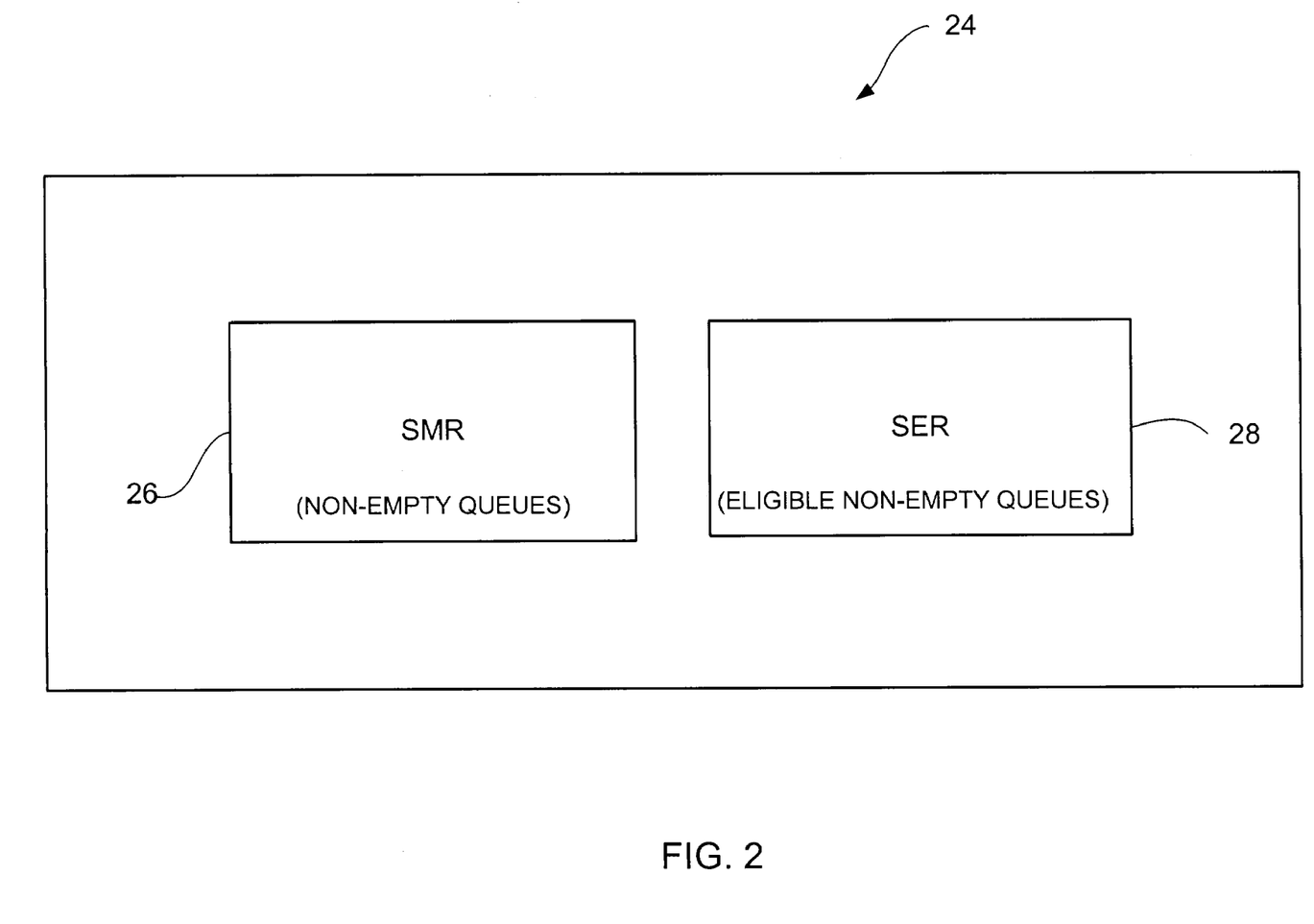
FIG. 2 is a block diagram illustrating a first embodiment of a scheduling system for the multi-level class hierarchy of FIG. 1.

A first embodiment is shown in FIG. 2, and generally indicated at 24. The scheduling system 24 includes two schedulers; a minimal rate scheduler (SMR) 26 and an excess rate scheduler (SER) 28. Both schedulers 26, 28 are rate-proportional work-conserving schedulers. A token bucket shaper is used for each node in the class hierarchy to limit the rate of each queue to its maximum rate. The rate of the token bucket corresponds to the configured maximum rate of the corresponding queue. SMR scheduler 26 contains all non-empty queues (i.e., queues containing at least one actual packet). SER scheduler 28 contains only non-empty queues which are eligible according to their token buckets (i.e., queues that do not exceed their maximum rate). The system comprised of SMR scheduler 26 and SER scheduler 28 provides for sharing of excess bandwidth between queues in proportion to minimum rates of the queues.

Each layer (level) in the class hierarchy maintains two virtual time calendar queues, one corresponding to the SMR scheduler 26 and one corresponding to the SER scheduler 28. Each scheduler 26, 28 uses minimal rates R of the nodes in the class hierarchy as the weights in the corresponding calendar queue.

Figure 3:
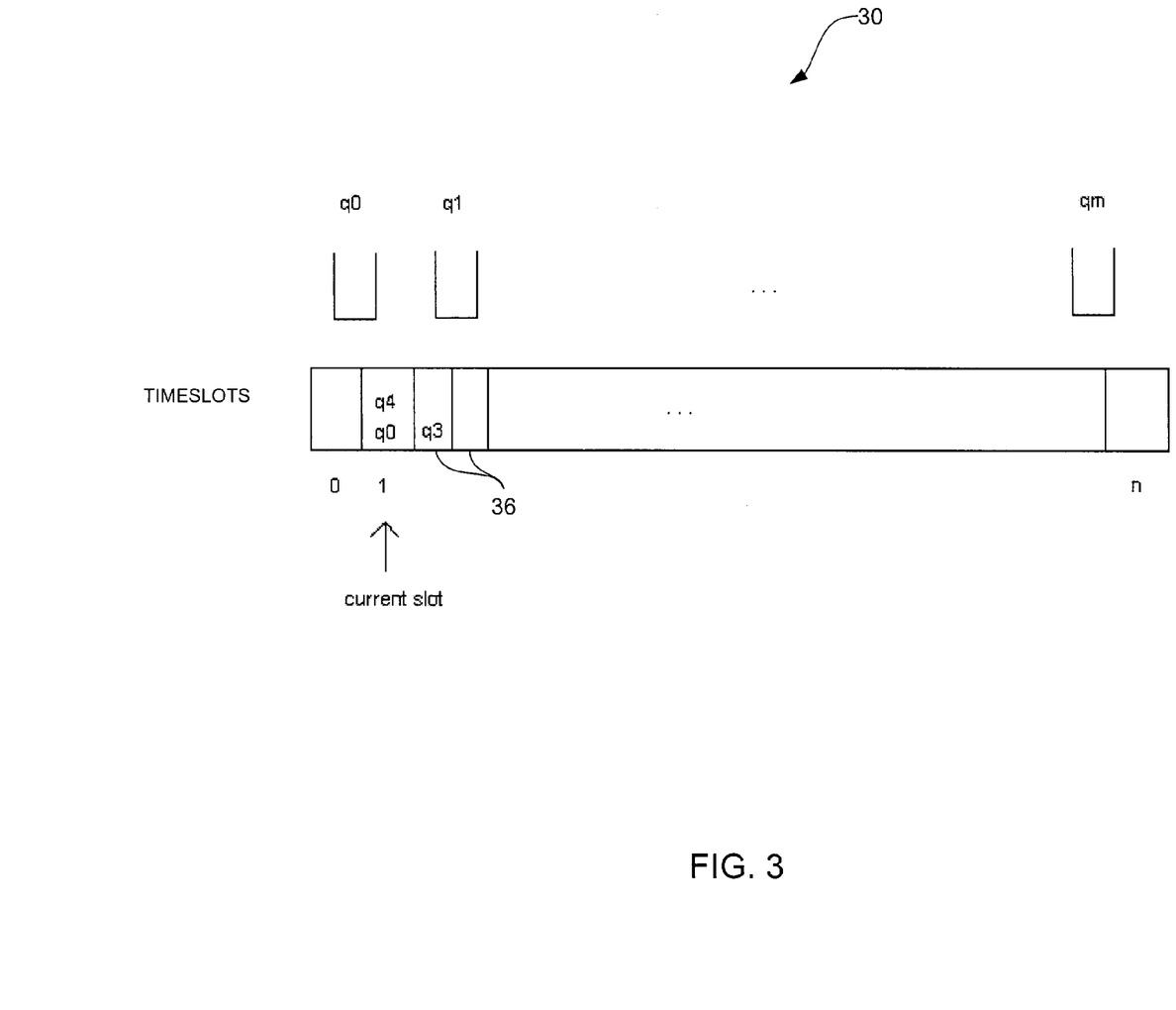
FIG. 3 is a diagram illustrating calendar queues of the scheduling system.

The system preferably utilizes virtual time calendar queues (as opposed to real-time calendar queues). The calendar queues 30 each include n timeslots 36, as shown in FIG. 3. Each timeslot 36 is associated with a particular time and each slot may contain (logically or physically) a list of packets to be served when time reaches the value associated with the timeslot. The calendar queue system 30 further includes m class queues that are scheduled by the calendar queues. The calendar queues 30 have several configurable parameters: time associated with the calendar queue timeslots (two options include virtual-time or real-time); granularity of the timeslots into the calendar queue; number of timeslots in the calendar queue; number of class queues; and the weight assigned to each class queue. The weight determines where in the calendar queue (i.e., which timeslot) a packet from the class gets scheduled.

At the leaf level in the hierarchy, the objects that are scheduled in the SMR and SER calendars are the actual packet queues. At all other levels, an object scheduled in a calendar corresponds to the node in the class hierarchy at that level. This node can be considered to represent a logical queue, where the logical queue, if non-empty, contains eligibility status (i.e., eligible or ineligible), as well as information used to identify the leaf queue and quantum of data on that leaf queue that represents the next quantum of data to be served from the logical queue. If any logical queue is scheduled in the SER calendar, then the queue has eligibility=eligible. Any logical queue that is currently eligible in its token bucket and has at least one non-empty descendent leaf is scheduled in both SMR and SER schedulers 26, 28. A logical queue that is ineligible in its token bucket but has at least one non-empty descendent leaf queue is scheduled in the SMR scheduler 26 but not in the SER scheduler 28. A logical queue that has no non-empty descendant leaves is not contained in either the SMR or SER scheduler. The SMR 26 scheduler is preferably a work conserving scheduler with respect to eligible queues.

As described in detail below, SMR scheduler 26 is first scheduled until either an eligible leaf queue or an ineligible node is reached. If an eligible queue is chosen, the packet is sent from that queue. If an ineligible node is chosen, the system 26 moves to the SER scheduler at the same point in the hierarchy where the ineligible dequeue occurred in SMR, and an eligible node is dequeued from SER. It is important to dequeue from SER at the same level of the hierarchy where the ineligible node was found in SMR, so as to ensure proper sharing of excess bandwidth throughout the hierarchy.

Figure 4:
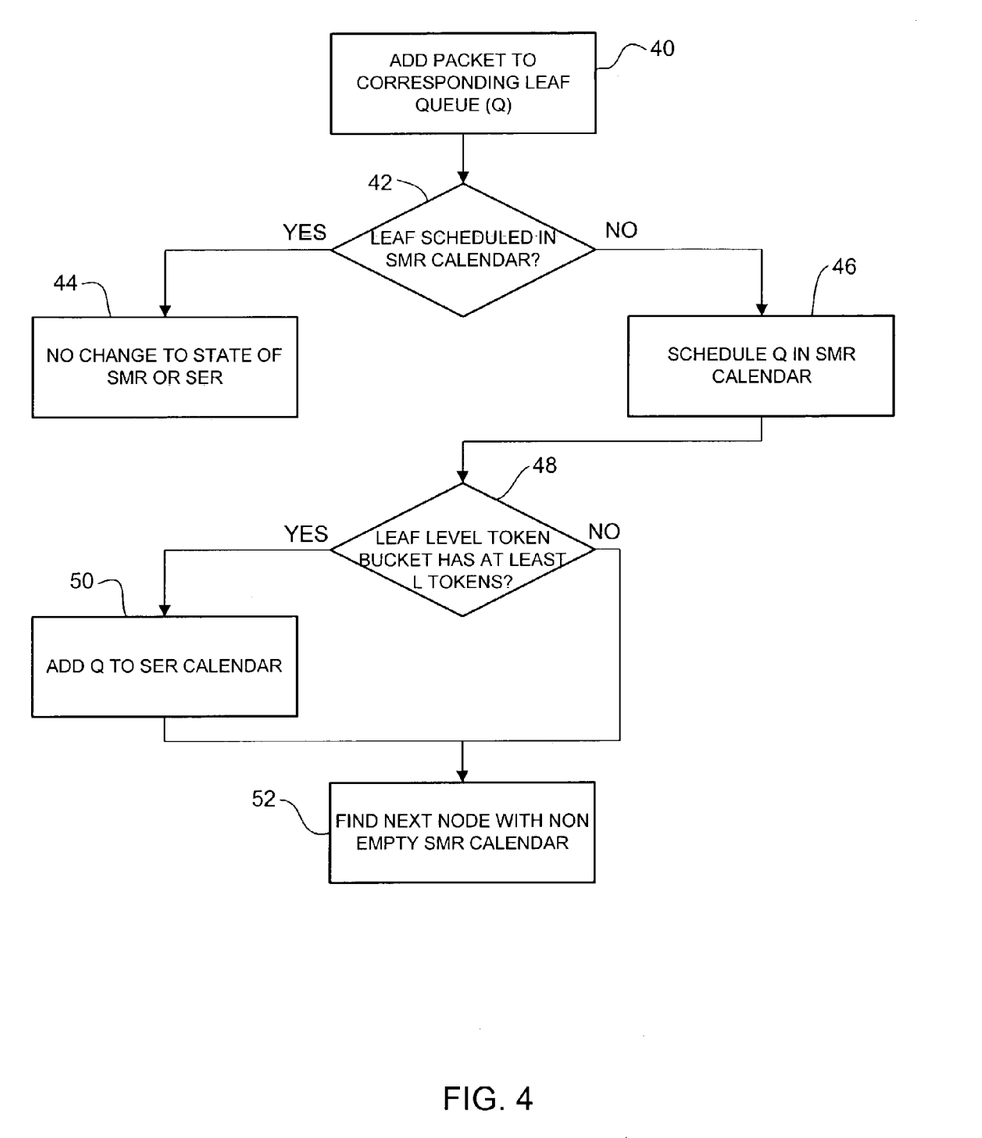
FIG. 4 is a flowchart illustrating a process for handling packet arrivals with the scheduling system of FIG. 2.

The following describes an example of how the scheduling system 24 deals with packet arrivals, queuing, and dequeuing. FIG. 4 is a flowchart illustrating one example of how the scheduling system 24 adds packets to queues during packet arrival and FIG. 5 is a flowchart illustrating an example of dequeuing from the SMR and SER calendars.

Upon arrival of a packet, the scheduling system adds the packet to the corresponding leaf queue Q (step 40). If the leaf is already scheduled in the SMR calendar at the leaf level, no further changes to the state of SMR or SER take place (steps 42 and 44). If the leaf queue is not already in the SMR calendar, the queue is scheduled in the leaf-level SMR calendar (step 46). The queue is scheduled either in a current slot, or in a slot saved with the queue when it became empty. If the leaf-level token bucket has at least L tokens (where L=packet size) Q is also added to the leaf-level SER calendar (steps 48 and 50). The scheduling system then traverses the hierarchy toward the root until it finds a node already present in its SMR calendar (step 52). At each level before that, when processing node N, the logical queue corresponding to N is added to SMR, and if N's token bucket has tokens, N is also added to the SER calendar. The logical packet is placed into this logical queue. Simultaneously, the logical packet and its corresponding logical queue are removed from the parent SMR and SER schedulers and the slot to which the logical queue needs to be scheduled if the queue becomes busy again is stored with the logical queue. It should be noted that an alternate implementation optimizes out the back-to-back enqueue and dequeue by detecting that the hierarchy is empty and thus the packet can move quickly toward the root. But for simplicity, the non-optimized version is described here.

Figure 5:
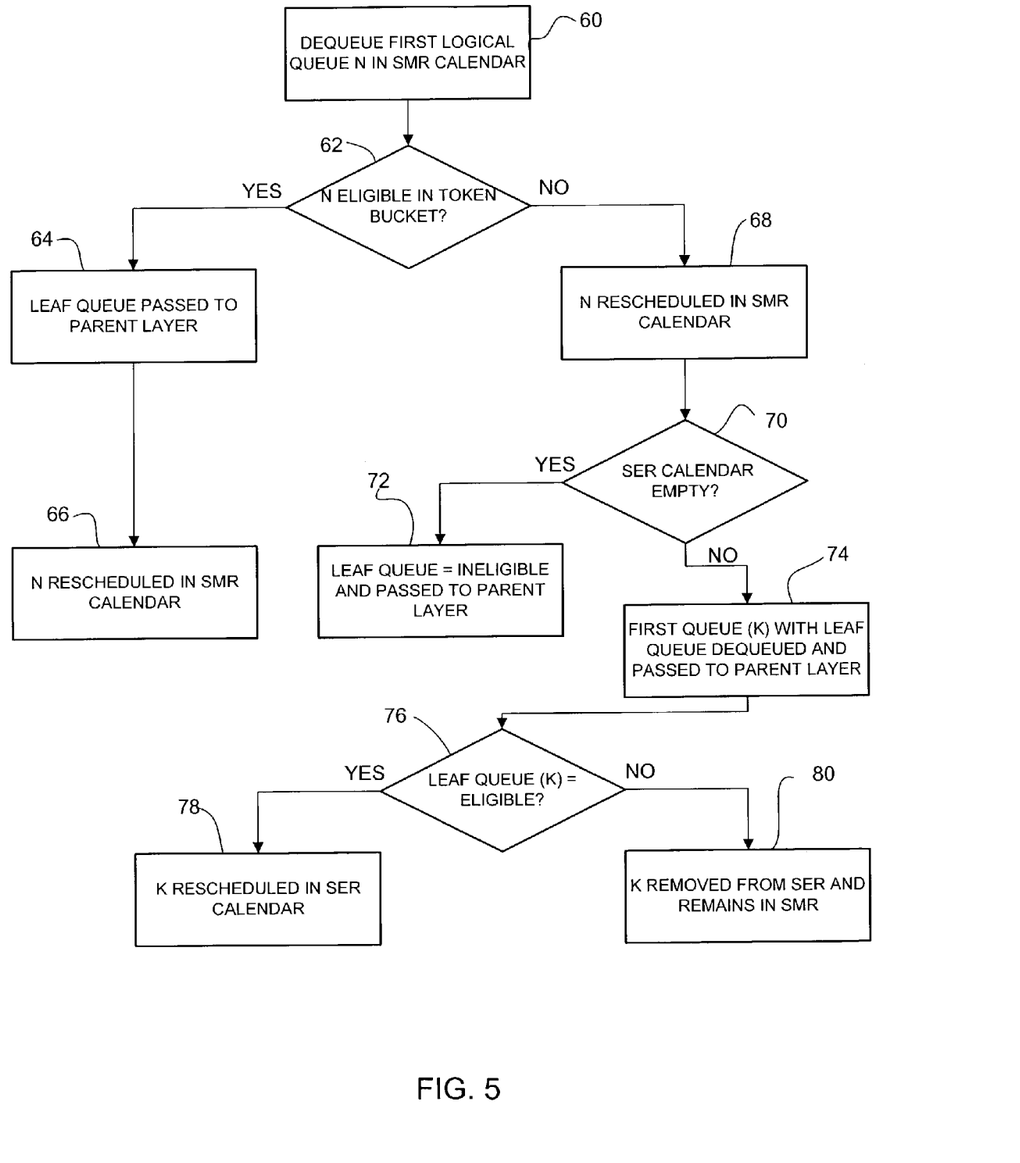
FIG. 5 is a flowchart illustrating a process for dequeuing queues in the scheduling system of FIG. 2.

Referring now to FIG. 5, the scheduling system first dequeues the first logical queue N in the SMR calendar at step 60. If N is eligible in its own token bucket, and if the leaf queue contained in the logical queue N has eligibility=eligible, then the leaf queue is passed to the parent layer (steps 62 and 64). In this case, the logical queue N is rescheduled in the SMR calendar queue (based on the size of the packet), and the child layer is called to supply a new leaf queue to be placed in N (step 66).

If N is ineligible in its token bucket or leaf queue has eligibility=ineligible, then N is rescheduled in SMR calendar (based on packet length) (step 68). This entails traversing up the hierarchy to give a child system of N the chance to acquire more tokens and transition from ineligible to eligible if necessary. The scheduler then checks the SER calendar (step 70). If the SER calendar is empty, the eligibility of the leaf queue is set to ineligible, and the leaf queue is passed to the parent layer (step 72). The queue N keeps the old leaf queue and the current scheduling opportunity is completed. If the SER is non-empty, the first queue K with leaf queue is de-queued and the leaf queue is passed to the parent layer (step 74). K's child layer is then invoked to provide new leaf queue information, and if the returned information represents an eligible queue, then K is rescheduled in SER based on the size M returned from K's child layer (steps 76 and 78). Otherwise, K is removed from SER and remains in SMR (step 80).

When a layer has scheduled a queue N from either the SMR or SER scheduler, its token bucket is updated to add the necessary number of tokens since the last update. This may cause a queue to move from ineligible to eligible, leading to insertion of the queue into SER, where previously it was not present in SER. If a logical queue becomes empty when dequeuing a logical packet in either the SMR or SER scheduler, the logical queue is removed from both calendars, and the next scheduling slot is stored with the logical queue.

In the present calendar queue implementation, while a queue is active and after the queue is serviced, the queue is rescheduled in the calendar system at time L/R in the future, where L is the length of the packet just sent and R is the configured rate of the queue, based on the configured rate of the queue. When a queue becomes empty or busy, the queue may be removed from the calendar queue, as described in U.S. patent application Ser. No. 10/243,436 (referenced above), for example.

It should be noted that in the first embodiment, when no queues are exceeding their configured (or implied) maximum rate, the system functions as a single virtual-time hierarchy.

The first embodiment discussed above is generally limited to sharing the excess bandwidth in proportion to the minimum rates of the queues. The second and third embodiments (described below) both allow sharing excess bandwidth in proportion to any configurable weights. Both the second and the third embodiments achieve this goal by a combination of: replacing a work-conserving minimum rate scheduler SMR of the first embodiment by a rate-controller, so that the SMR scheduler limits every queue to its minimal rate R(i); configuring the maximum rate token buckets to the rate R-M instead of M; and configuring the weights in the rate-proportional work-conserving SER to arbitrary desired sharing weights (as opposed to the fixed weights proportion to the minimum rates as in the first embodiment). As described below, the difference between the second and the third embodiments is in the implementation of the rate-controller comprising the minimal rate scheduler.

Figure 6:
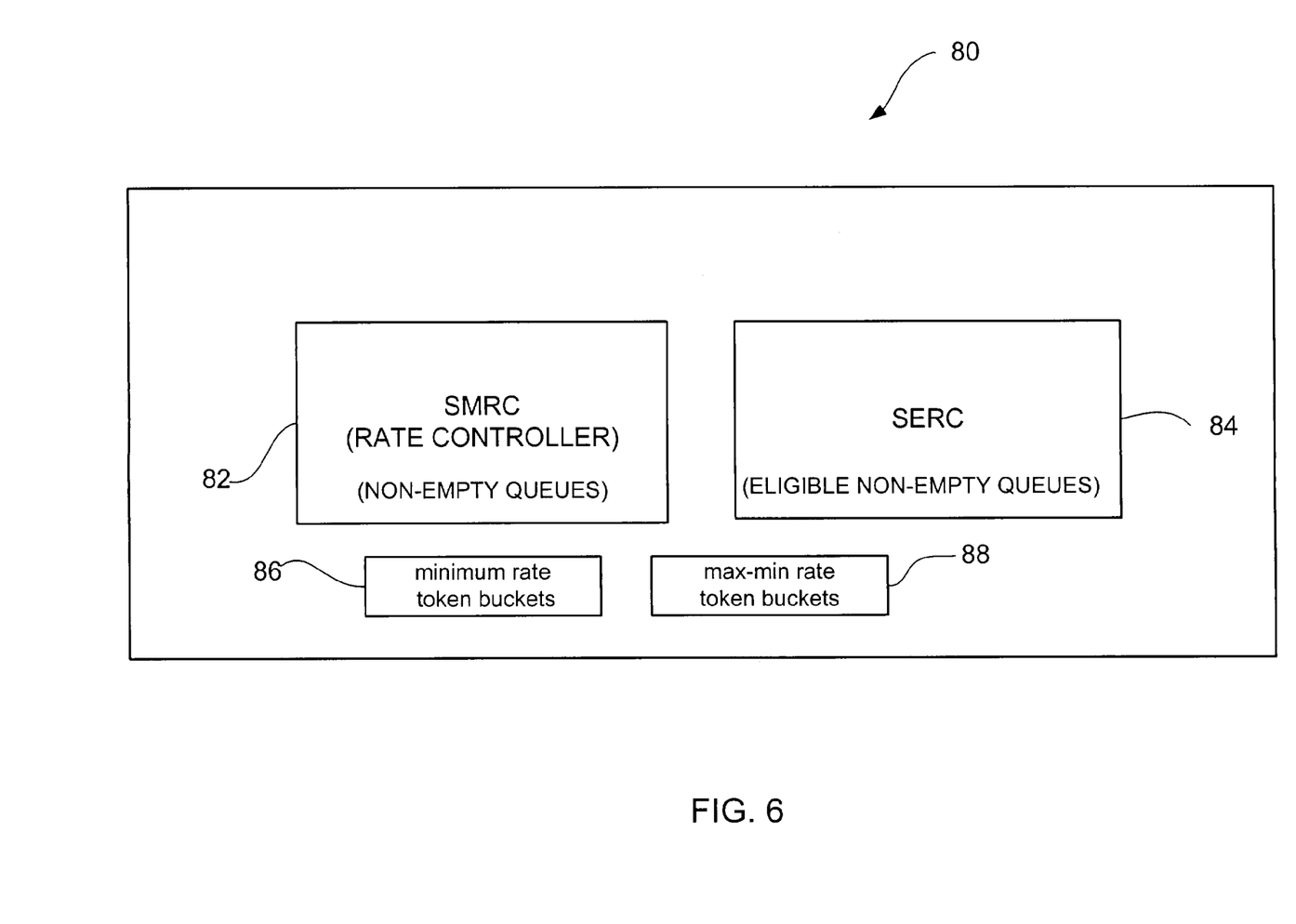
FIG. 6 is a block diagram illustrating a second embodiment of a scheduling system for the multi-level class hierarchy of FIG. 1.

The second embodiment of the scheduling system is shown in FIG. 6, and generally indicated at 80. Scheduling system 80 is configured such that excess bandwidth can be shared in proportion to an arbitrary configured weight, which may be preset or selected by a user. As shown in FIG. 6, the scheduling system 80 includes two schedulers SMRC 82 and SERC 84. Each node includes a first token bucket 86 configured at the minimum rate guaranteed to the node and a second token bucket 88 configured at the difference between the maximum and the minimum rates of the node. SMRC scheduler 82 contains all non-empty queues (i.e., queues containing at least one actual packet). SERC scheduler 84 contains only non-empty queues which are eligible according to their second token buckets (i.e., queues that do not exceed their maximum rate minus their minimum rates).

The SMRC scheduler 82 is a combination of a rate-proportional work-conserving scheduler and a set of token buckets 86 (referred to above as the "first token buckets"), one per queue, configured with the minimal rates R(i). This combination makes SMRC scheduler 82 a rate controller which schedules queues based on minimum rates only if the queue does not exceed its minimum rate. Thus, service from SMRC is allowed only if tokens are available in this minimum rate bucket. If tokens are not available in the minimum rate bucket, the SERC scheduler 84 performs a dequeue from the SERC scheduler based on a user configurable rate. Excess bandwidth is thus shared in proportion to an arbitrary configured weight. The queues can be scheduled in the SERC scheduler 84 based on configurable rates because no queue will be serviced more than its minimum rate from the SMRC scheduler 82, and it will not exceed its maximum rate because its service in the SERC scheduler is limited to the difference between its maximum and minimal rates, due to the second set of token buckets 88.

The packet arrival and dequeuing process is similar to the process described above for the first embodiment 24 except that packets are dequeued from the SMRC calendar only if they are eligible in their minimum rate token buckets. Otherwise, they are dequeued from the SERC calendar. The other difference is that unlike the first embodiment, where dequeuing from the SMR scheduler resulted in removal of tokens from the maximum rate token bucket, in the second embodiment, when a queue is dequeued from the SMRC scheduler, tokens are not removed from the second (maximum rate) token bucket 88, but are removed from the minimum rate token bucket 86. However, tokens are added to the maximum and minimum token buckets when a queue is scheduled in either scheduler.

Figure 7:
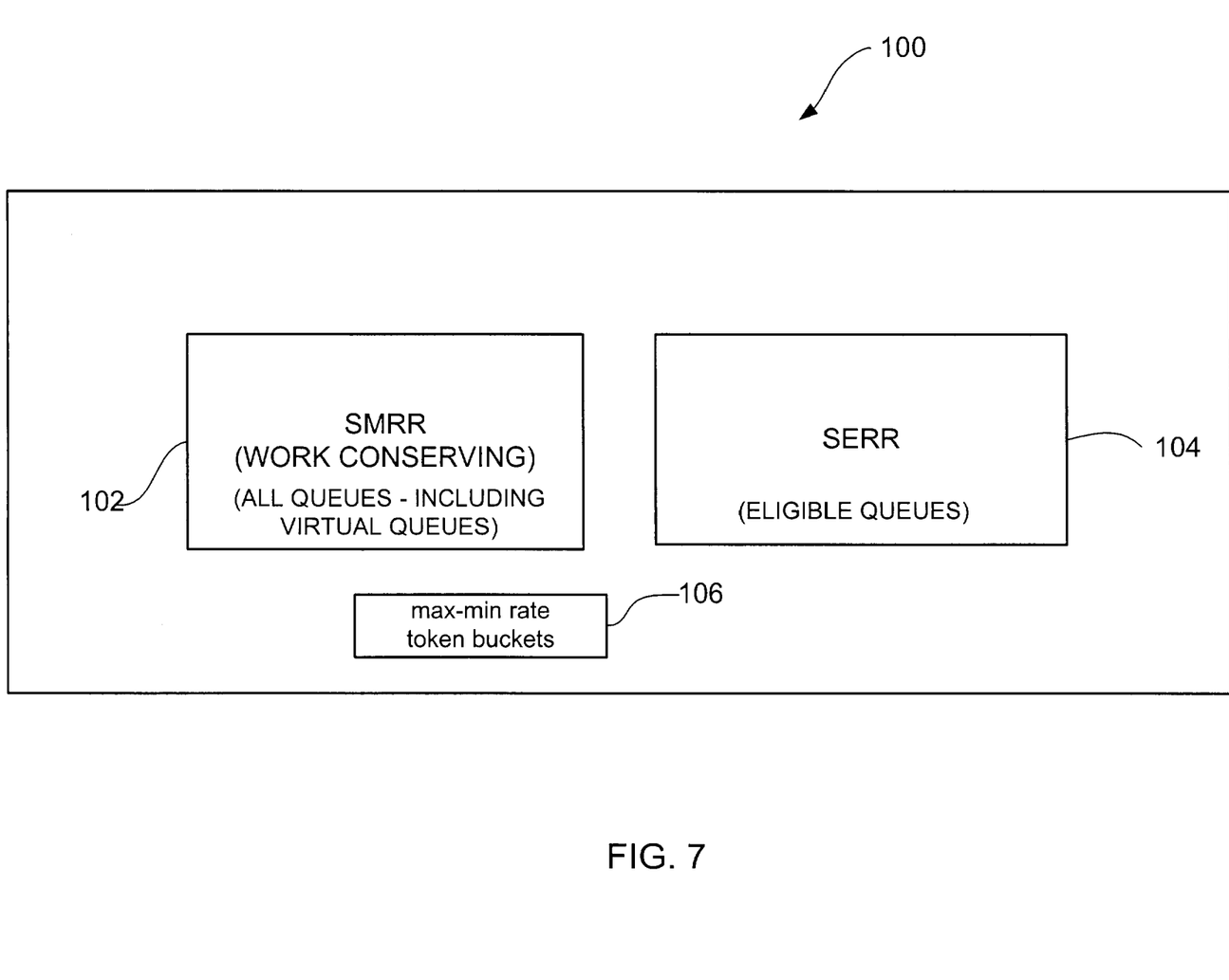
FIG. 7 is a block diagram illustrating a third embodiment of a scheduling system for the multi-level class hierarchy of FIG. 1.

A third embodiment is shown in FIG. 7, and generally indicated at 100. This embodiment 100 differs from the second embodiment 80 in the construction of the minimal rate scheduler, but otherwise is similar to the second embodiment.

The scheduling system 100 includes two schedulers SMRR 102 and SERR 104. The SMRR scheduler 102 provides each queue only its minimal rate, while the excess rate is served by the SERR scheduler 104. The third embodiment also contains one set of token buckets configured to the rate equal to the maximum rate (M) minus minimum rate (R)). The SERR scheduler 104 is generally identical to the SERC scheduler of the second embodiment and includes only eligible queues (based on maximum rate minus minimum rate (M−R)) and schedules queues based on a configurable rate, as previously described above for the second embodiment, so that the excess bandwidth is shared in proportion to an arbitrary configured weight.

As in the second embodiment, the minimum rate SMRR scheduler 102 is configured based on the minimum rate R of the queues. However, as described below, the set of queues it contains is different. The SMRR scheduler 102 preferably contains all of the nodes in the class hierarchy. In addition, if the sum of the rates R of all of the leaf queues of a node N is less than the rate R of node N, then an additional leaf queue N (referred to as a virtual node) is added to SMRR scheduler 102, with a rate equal to the excess of the rate R of N over the sum of rates R of N's leaf queues. These virtual nodes preferably always contain at least one virtual packet. The virtual packets have eligibility=ineligible.

The operation of the third embodiment is similar to that of the second embodiment, but with the following differences:
a) when a queue/node is actually empty, the scheduler operates as if it has a virtual packet of minimum size marked with eligibility=ineligible in the SMRR calendar.
b) when a queue is scheduled in the SMRR tree, the tokens are added to the token bucket according to the configured rate, but the size of the "sent" packet is not removed from it. This is because the token buckets in this case are used to meter the excess rate only.
c) when a queue is scheduled in the SERR tree, the token bucket is updated to account for the new tokens due and the packet sent (just as in the second embodiment, in this case).
d) when the root has to process a packet with eligibility—ineligible, it simply stalls for the duration of time that is required to process the packet at the speed of the interface.

It should be noted that due to the stalling described above the third embodiment is particularly suitable for systems where the real time clock of sufficient granularity is available. In the case when clock granularity is very crude, stalling may introduce substantial inaccuracies. In such cases the second embodiment is more preferable.

Figure 8:
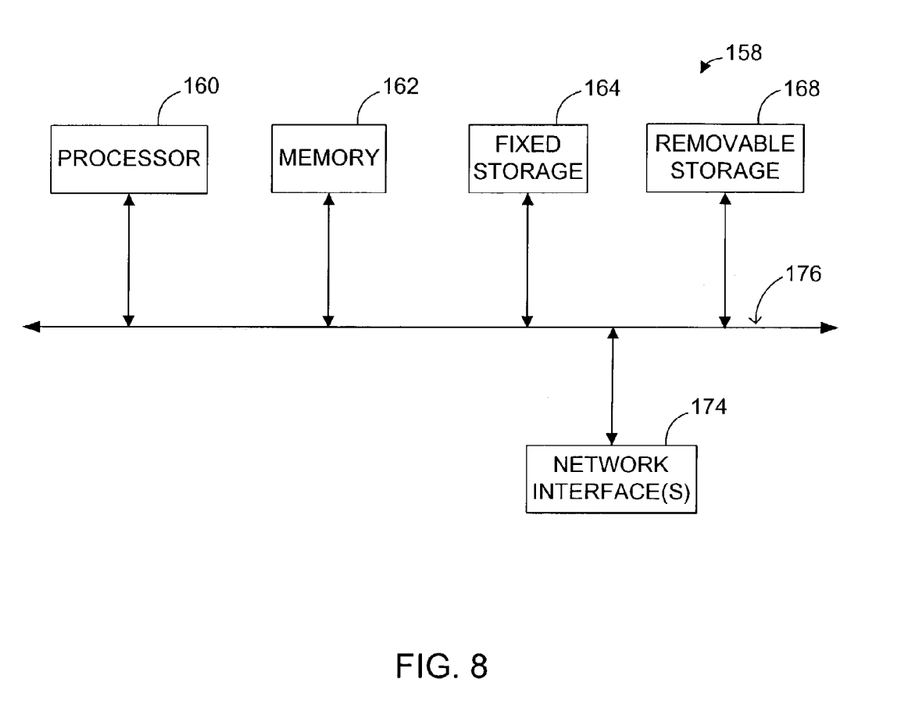
FIG. 8 is a system block diagram of a computer system that can be utilized to execute software of an embodiment of the present invention.

FIG. 8 shows a system block diagram of computer system 158 that may be used to execute software of an embodiment of the invention. The computer system 158 includes memory 162 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. A data signal embodied in a carrier wave is an example of a transmission medium. Computer system 158 further includes subsystems such as a central processor 160, fixed storage 164, removable storage 168, and one or more network interfaces 174. Other computer systems suitable for use with the invention may include additional or fewer subsystems.

The system bus architecture of computer system 158 is represented by arrows 176 in FIG. 8. However, these arrows are only illustrative of one possible interconnection scheme serving to link the subsystems. For example, a local bus may be utilized to connect the central processor 160 to the system memory 162. Computer system 158 shown in FIG. 8 is only one example of a computer system suitable for use with the invention. Other computer architectures having different configurations of subsystems may also be utilized. Communication between computers within the network is made possible with the use of communication protocols, which govern how computers exchange information over a network.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A scheduling system for a multi-level class hierarchy having a plurality of layers, each layer containing a plurality of queues and comprising:
    a first scheduler configured to provide a minimum rate to a plurality of queues, each of said queues containing at least one packet, wherein the first scheduler is a work conserving scheduler; and
    a second scheduler configured to provide an excess rate to queues of said plurality of queues not exceeding a maximum rate of the queue;
    wherein the scheduling system is configured to dequeue from the first scheduler until a queue exceeding a maximum rate of the queue is reached and then dequeue from the second scheduler at the same layer in the hierarchy as the queue exceeding the maximum rate of the queue, and wherein a dequeued node in said hierarchy is used to find a next layer to perform a dequeue.

2. The scheduling system of claim 1 wherein the second scheduler is configured to share excess bandwidth among said plurality of queues.

3. The scheduling system of claim 2 wherein the excess bandwidth is shared in proportion to minimum rates of the queues.

4. The scheduling system of claim 1 wherein the first and second schedulers are virtual time-rate proportional schedulers.

5. The system of claim 1 further comprising a calendar queue associated with each of the schedulers.

6. The system of claim 5 wherein the calendar queues are virtual time calendar queues.

7. A scheduling method for a multi-level class hierarchy having a plurality of layers, each layer containing a plurality of queues and first and second schedulers, the method comprising:
   inserting all queues containing at least one packet in the first scheduler;
   inserting into the second scheduler queues contained in the first scheduler that do not exceed their maximum rate;
   dequeuing from the first scheduler until a queue exceeding a maximum rate of the queue is reached, wherein dequeuing from the first scheduler comprises passing a leaf queue to a parent layer; and
   dequeuing from the second scheduler when a queue exceeding a maximum rate of the queue is reached in the first scheduler, wherein dequeuing from the second scheduler is at the same layer in the hierarchy as the queue exceeding the maximum rate;
   wherein the first scheduler is a work conserving scheduler.

8. The method of claim 7 wherein dequeuing from the second scheduler comprises passing a queue to a parent layer if the second scheduler is empty.

9. The method of claim 7 further comprising rescheduling an active queue after the queue is serviced by one of the first and second schedulers.

10. The method of claim 7 wherein each of said first and second schedulers is scheduled in virtual time.

11. The method of claim 7 further comprising using a calendar queue to schedule queues at said first and second schedulers.

12. A computer program product for a multi-level class hierarchy having a plurality of layers, each layer containing a plurality of queues and first and second schedulers, the product comprising:
   code that inserts all queues containing at least one packet in the first scheduler;
   code that inserts into the second scheduler queues contained in the first scheduler that do not exceed their maximum rate;
   code that dequeues from the first scheduler until a queue exceeding a maximum rate of the queue is reached, wherein dequeuing from the first scheduler comprises passing a leaf queue to a parent layer;
   code that dequeues from the second scheduler when a queue exceeding a maximum rate of the queue is reached, wherein dequeuing from the second scheduler is at the same layer in the hierarchy as the queue exceeding the maximum rate; and
   a computer-readable storage medium for storing said codes;
   wherein the first scheduler is a work conserving scheduler.

13. A scheduling system for a multi-level class hierarchy having a plurality of layers, each layer containing a plurality of queues and comprising:
   a first scheduler configured to provide a minimum rate to a plurality of queues, each of said queues containing at least one packet, wherein the first scheduler is a work conserving scheduler; and
   a second scheduler configured to schedule queues of said plurality of queues not exceeding a maximum rate of the queue, the second scheduler configured to share excess bandwidth in proportion to a user selected weight;
   wherein the scheduling system is configured to dequeue from the first scheduler until a queue exceeding a maximum rate of the queue is reached and then dequeue from the second scheduler at the same layer in the hierarchy as the queue exceeding the maximum rate, and wherein a dequeued node in said hierarchy is used to find a next layer to perform a dequeue.

14. The scheduling system of claim 13 further comprising a calendar queue associated with each of the schedulers.

15. The scheduling system of claim 13 wherein the multi-level class hierarchy comprises three layers.

16. The scheduling system of claim 13 wherein the first scheduler is a rate-proportional scheduler.

17. A scheduling system for a multi-level class hierarchy having a plurality of layers, each layer comprising:
   a first scheduler configured to provide a minimum rate to a plurality of real queues containing packets and virtual queues containing virtual packets, wherein the first scheduler is a work conserving scheduler; and
   a second scheduler configured to schedule queues of said plurality of real queues not exceeding a maximum rate of the queue minus a minimum rate of the queue, the second scheduler configured to share excess bandwidth in proportion to a user selected weight;
   wherein the scheduling system is configured to dequeue from the first scheduler until a queue exceeding a maximum rate of the queue is reached and then dequeue from the second scheduler at the same layer in the hierarchy as the queue exceeding the maximum rate, and wherein a dequeued node in said hierarchy is used to find a next layer to perform a dequeue.

18. The system of claim 17 further comprising a calendar queue associated with each of said schedulers.

19. The system of claim 18 wherein the calendar queues are real time calendar queues.

* * * * *